Sept. 29, 1936.  J. B. BAKER  2,055,714
ROLLER BEARING
Filed Nov. 14, 1935
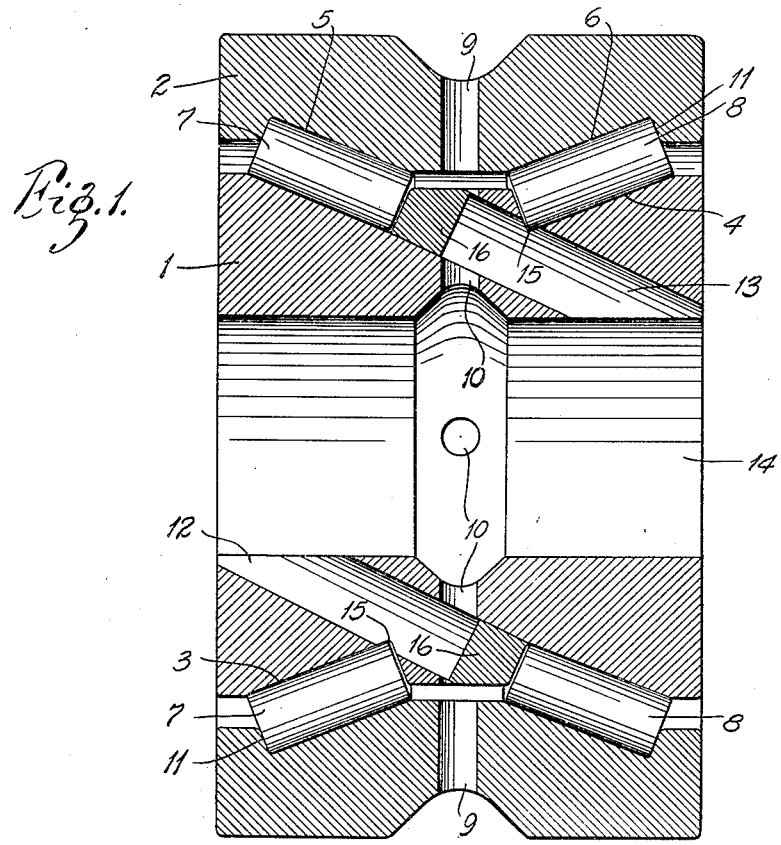
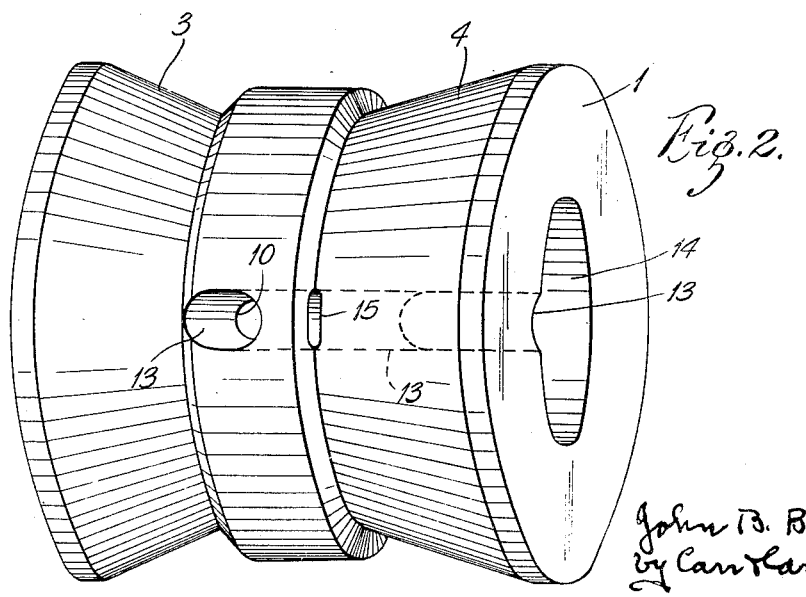
INVENTOR:
John B. Baker,
by Carr Carr & Gravely,
HIS ATTORNEYS.

Patented Sept. 29, 1936

2,055,714

UNITED STATES PATENT OFFICE 2,055,714

ROLLER BEARING

John B. Baker, Canton, Ohio, assignor to The Timken Roller Bearing Company, Canton, Ohio, a corporation of Ohio Application November 14, 1935, Serial No. 49,661

5 Claims. (Cl. 308—213)

My invention relates to roller bearings and is especially suited for use where the moving part oscillates back and forth instead of rotating continuously in one direction. The invention is especially applicable to a bearing with two series of rollers mounted on conical raceways; and it has for its principal object to produce the bearing with as few parts as practicable and to provide for the assembling thereof. The invention consists in the parts and in the arrangements and combinations of parts hereinafter described and claimed.

In the accompanying drawing, wherein like parts refer to like reference numerals wherever they occur, Fig. 1 is a longitudinal sectional view of a bearing conforming to my invention, and Fig. 2 is a perspective view of the inner bearing member thereof.

The bearing shown in the drawing comprises an integral inner bearing member 1 and an integral outer bearing member 2. The inner bearing member has two conical raceways 3, 4 spaced apart and tapering towards each other. The outer bearing member has two raceways 5, 6 that are spaced apart that taper towards each to match the inner raceways respectively. The inner and outer raceways of each pair taper at the same angle so that a plane through the common axis thereof intersects said raceways in parallel lines. Between the raceways of each pair is a series of cylindrical rollers 7, 8. Both the inner and outer bearing members are provided with radial lubricating holes 9, 10 located between the raceway surfaces thereof.

The outer bearing member has annular thrust ribs 11 at the large ends of its raceways. The inner face of each of these thrust ribs is undercut and the ends of the cylindrical rollers are flat or otherwise adapted so that the marginal portion of each roller will bear against the thrust rib at two points that are spaced apart on opposite sides of the axial line of the roller. By this arrangement, the thrust endwise of the roller tends to keep the roller in proper alinement and to restore it to proper alinement when it cants or gets askew.

In order to provide for the proper assembling of the parts of the bearing, the inner bearing member is provided with loading holes 12, 13 of somewhat larger diameter than the individual roller. There is one loading hole for each series of rollers. Each loading hole extends through the inner bearing member with its outer opening located next to the inner or small end of a raceway surface; and from this point, said hole extends through said inner bearing member in the general direction of the taper of said raceway, that is, the inclination of the loading hole approximates the angle of taper of said raceway. As the two raceways of said inner bearing member are spaced apart, the loading hole for the series of rollers on one raceway (say raceway 5) extends between the other raceway (6) and the bore 14 of said bearing member. In the design illustrated, the inner opening of the loading hole is partly in the bore and partly in the end of said inner bearing member.

It is noted that, in the particular design illustrated, the loading hole for one series of rollers cuts through the edge of the small end of the raceway of the other series of rollers as shown at 15. This is due to the desire to keep from spacing the raceways further apart; and for the same reason, the loading hole is inclined somewhat more than the taper of the raceway. However, the notching of the raceway is so slight that it does not interfere with the service of the raceway nor does it interfere with the loading of rollers onto the other raceway, as it is quite easy to crowd aside any roller whose edge happens to extend into the loading hole. Preferably, a plug 16 is mounted in each of the loading holes close to the raceway to prevent endwise displacement of the rollers.

The bearing hereinbefore described is very simple, requires no guiding or spacing cage for the rollers and is composed of a minimum number of parts. While it is especially applicable to duplex or double-row bearings, it is also applicable to bearings that have only a single row or set of rollers.

What I claim is:

1. A double row roller bearing comprising an integral outer bearing member having two conical raceway portions tapering towards each other, an integral inner bearing member having two conical raceway portions tapering towards each other and parallel to the respective raceway portions of said outer bearing member, and a series of cylindrical rollers between each pair of raceways, said inner bearing member having a filling hole for each series of rollers, each filling hole extending inwardly from the inner end of a raceway at substantially the same angle as said raceway.

2. A double row roller bearing comprising an integral outer bearing member having two conical raceway portions tapering towards each other and thrust ribs at the large ends of said raceways, an integral inner bearing member having two conical raceway portions tapering towards each other and parallel to the respective raceway portions of said outer bearing member, and a series of cylindrical rollers between each pair of raceways, said inner bearing member having a filling hole for each series of rollers, each filling hole extending inwardly from the inner end of a raceway at substantially the same angle as said raceway.

3. A double row roller bearing comprising an integral outer bearing member having two conical raceway portions tapering towards each other, an integral inner bearing member having two conical raceway portions tapering towards each other and parallel to the respective raceway portions of said outer bearing member, and a series of cylindrical rollers between each pair of raceways, said inner bearing member having a filling hole for each series of rollers, each filling hole extending inwardly from the inner end of a raceway at substantially the same angle as said raceway and plugs in said holes for preventing endwise movement of said rollers.

4. A roller bearing comprising an outer bearing member having a conical raceway having a thrust rib at its large end, an inner bearing member having a conical raceway parallel to the raceway of said outer bearing member, and a series of cylindrical rollers between said raceways, said inner bearing member having a filling hole for the rollers, said filling hole opening through the outer surface of said inner bearing member at the small end of its raceway.

5. An integral inner bearing member for a duplex roller bearing, said member having an axial bore and two conical raceway surfaces spaced apart and tapering toward each other, said member having a loading hole for each raceway, each hole inclining at approximately the same angle as its raceway surface and opening at one end into the end portion of said bore and opening at its other end in the space between said raceway surfaces and substantially flush with its raceway surface at the small end thereof.

JOHN B. BAKER.